April 28, 1959  M. CANDIDO, JR., ET AL  2,883,984
PELLET IMPLANTER
Filed Sept. 9, 1957  2 Sheets-Sheet 1
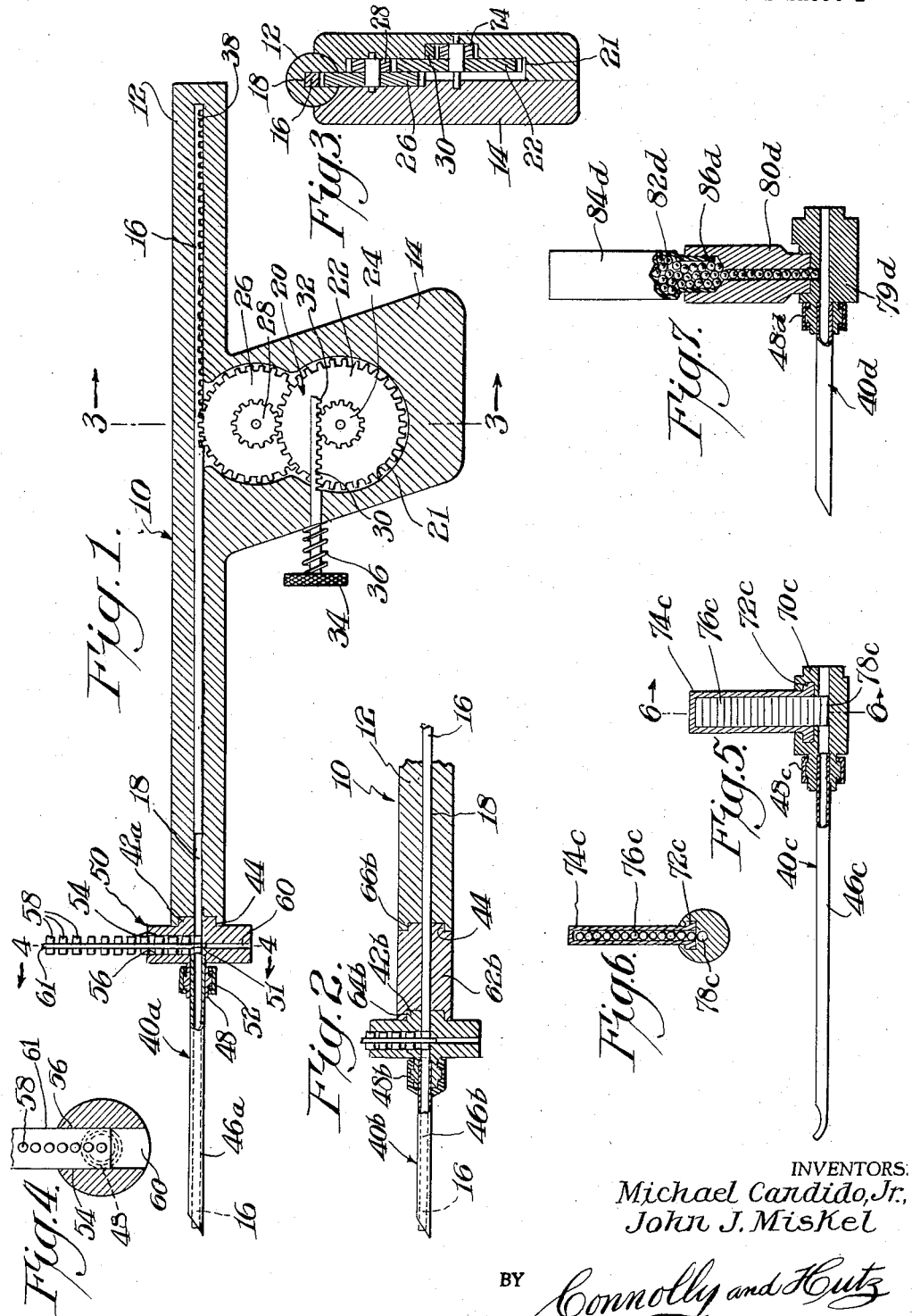
INVENTORS:
Michael Candido, Jr.,
John J. Miskel
BY Connolly and Hutz
ATTORNEYS

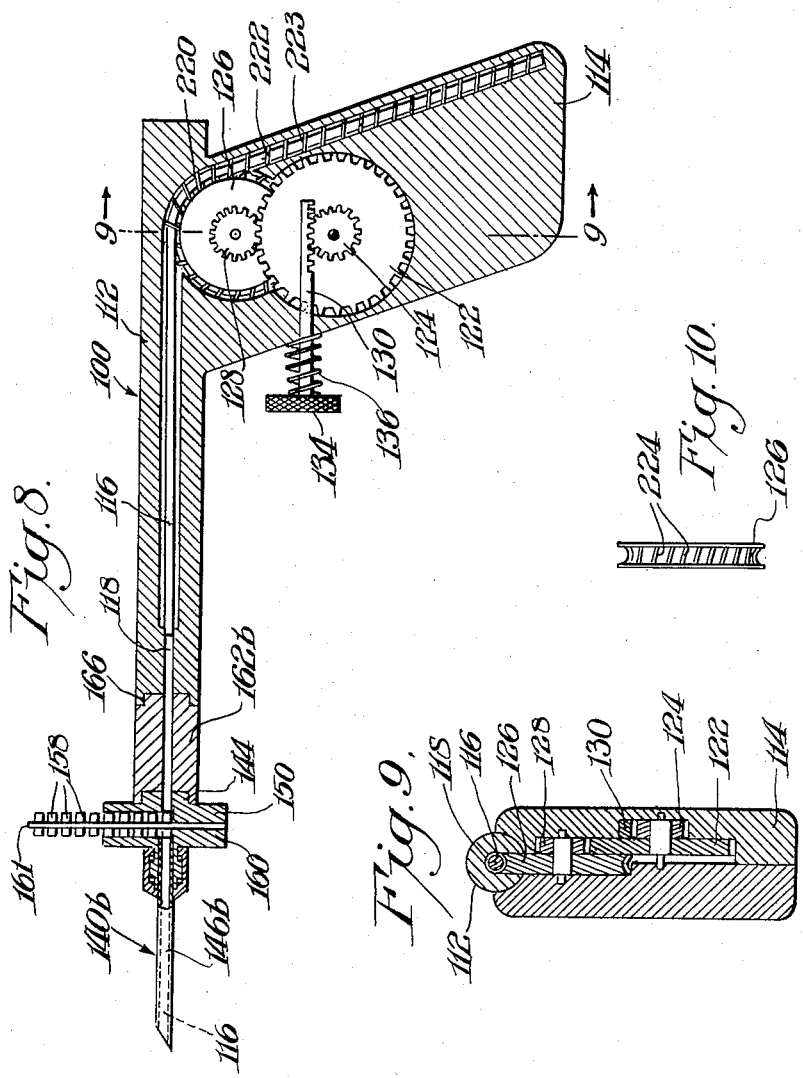

United States Patent Office 2,883,984
Patented Apr. 28, 1959

2,883,984

PELLET IMPLANTER

Michael Candido, Jr., Crestwood, and John J. Miskel, Brooklyn, N.Y., assignors to Chas. Pfizer & Co., Inc., Brooklyn, N.Y., a corporation of Delaware Application September 9, 1957, Serial No. 682,731

10 Claims. (Cl. 128—217)

This invention relates to a device for implanting pellets beneath a surface, and more particularly relates to a pellet implanting gun for implanting pellets beneath the skin of animals.

The currently prevalent practice of implanting hormones and/or antibiotics beneath the skin of animals in pellet form to increase their weight and enhance the flavor and tenderness of their meat has given rise to a need for a convenient device for implanting these pellets. Such pellets are implanted in both smaller animals such as poultry and in larger animals such as beef cattle. They are preferably implanted in the necks of smaller animals such as chickens near their heads to permit any residue to be disposed of by discarding the head and neck before the animal is sold to the consumer. The depth of implantation in a chicken's neck must be limited and, therefore, a needle of relatively short length will be employed. In the case of larger animals, such as beef cattle, the implant site is at the base of the ear, and the ear is normally discarded during the processing of the animal after slaughter. The length, shape and resistance to penetration of the ear requires a longer needle that will permit puncture of the ear at its mid-point followed by a thrust to the base of the ear where the pellet will be expelled from the needle. It is apparent, then, that needles of different length are required and that the provision of an implanting gun capable of cooperating with needles of different size would be an important advance in the art.

An object of this invention is to provide an implanting instrument which can be used for implanting pellets in animals of all sizes.

In accordance with this invention, a pellet implanting gun includes a plunger actuating means which is connectable to needle assemblies of varying length. Inserts are provided which can be coupled between a needle assembly and the plunger actuating means. The lengths of the needle assemblies, the inserts, and the working stroke of the plunger are constructed and arranged to permit the plunger to optionally move through an operative working stroke of predetermined length through the combination of a relatively long insert and a relatively short needle assembly or through a relatively long needle assembly either directly connected to the guide means or connected to it through a relatively short insert. This permits the same plunger actuating means to be used for implanting pellets different predetermined distances below the skins of animals of varying sizes. The expression "needle combination" is used herein to designate all of the parts which are detachably connected to the front end of the plunger actuating means. This needle combination may incorporate only a relatively larger needle, or it may incorporate a needle, an insert, and possibly a magazine.

Novel features and advantages of the present invention will become apparent to one skilled in the art from a reading of the following description in conjunction with the accompanying drawings wherein similar reference characters refer to similar parts and in which:

Fig. 1 is a cross-sectional view in elevation of a portion of an embodiment of this invention;

Fig. 2 is a cross-sectional view in elevation of another portion of the embodiment shown in Fig. 1;

Fig. 3 is a cross-sectional view taken through Fig. 1 along the line 3—3 and looking in the direction of the arrows;

Fig. 4 is a cross-sectional view taken through Fig. 1 along the line 4—4 and looking in the direction of the arrows;

Fig. 5 is a cross-sectional view in elevation of a modified portion of the embodiment shown in Fig. 1;

Fig. 6 is a cross-sectional view taken through Fig. 5 along the line 6—6 and looking in the direction of the arrows;

Fig. 7 is a cross-sectional view in elevation of another modified portion of the embodiment shown in Fig. 1;

Fig. 8 is a cross-sectional view in elevation of a portion of another embodiment of this invention;

Fig. 9 is a cross-sectional view taken through Fig. 8 along the line 9—9 and looking in the direction of the arrows; and Fig. 10 is a view in elevation of a portion of the embodiment shown in Figs. 8 and 9.

In Figs. 1 and 2 are shown related portions of a pellet implanting gun 10 which is one embodiment of this invention. Parts designated by unaccompanied reference numerals are universally used with all sizes of animals, but parts marked with reference characters followed by a letter suffix are used alternatively with either larger or smaller animals.

In Fig. 1 is shown a pellet implanting gun 10 including a plunger guide means 12 which is, for example, a hollow rod including a longitudinal passageway which is square in cross section. Hollow rod 12 is mounted upon a pistol grip member 14. An elongated plunger 16, for example, also square in cross section is inserted to slide within the longitudinal passageway 18 in guide means 12. A manually operable plunger actuating means 20 is mounted within a cavity 21 in pistol grip member 14 as further shown in Fig. 3; and it is constructed, for example, in the form of a compound gear train including interconnected spur and pinion gears 22 and 24 which are engaged with interconnected spur and pinion gears 26 and 28 in a speed increasing relationship with spur gear 22 meshed with pinion gear 28. A rod 30 is mounted to slide within a slot within pistol grip member 14 and includes a rack 32 of gear teeth cut in its lower surface which meshes with pinion gear 24. A trigger 34 is connected to an external portion of rod 30 for manually actuating the gear train. A spring 36 is mounted about rod 30 between trigger 34 and the outer surface of pistol grip member 14 to return trigger member 34 to its original position after it has been squeezed and released.

Final spur gear 26 is meshed with a rack 38 of gear teeth cut in the lower portion of plunger rod 16, as is shown in detail in Fig. 3, to cause plunger rod 16 to be rapidly thrust forward through its indicated length of travel when trigger 34 is squeezed. A suitable stop means (not shown) is provided between plunger rod 16 and guide means 18 to prevent plunger 16 from being thrown forward out of engagement with a spur gear 26.

In Fig. 1, a needle assembly 40a, of a relatively longer length relative to needle assembly 40b shown in Fig. 2, is mounted directly upon the front end of guide means 12 by means of interlocking projection 42a upon assembly 40a and a recess 44 within the front end of guide means 12.

Needle assembly 40a includes a hollow needle 46a mounted within the snout 48 of a magazine receiving member 50 and held in firm engagement therewith by means of a clamping ring 52. Magazine member 50 also includes the projection 42a. Clamping ring 52 permits needles of varying size to be connected to combination magazine receiving and coupling member 50.

Magazine member 50 includes a passageway 51 which is a continuation of passageway 18, and it also includes a passageway 54 disposed substantially perpendicularly to passageway 51. The upper portion of passageway 54 is, for example, enlarged at 56 to receive successive pellets 58 as they pass into alignment with passageway 51. However, the lower portion 60 of passageway 54 is smaller in cross section, for example, to receive a card 61 upon which pellets 58 are mounted, for example.

Comparing Fig. 2 with Fig. 1, the majority of the parts are substantially similar with the exception that needle 46b is quite a bit shorter than needle 46a. To compensate for this shorter needle length and to help accommodate the full stroke of plunger 16 shown in broken outline in both Figs. 1 and 2, an insert 62b is mounted between the coupling projection 42b of needle assembly 40b and the recess 44 in the end of the guide means 12. Insert 62b includes a suitable recess 64b and a projection 66b for coupling it between a needle assembly 40b and guide means 12. As is apparent in comparing Figs. 1 and 2, insert 62b accommodates the portion of the plunger stroke which would project past the end of needle 46b if insert 62b were not present. However, when insert 62b is mounted between needle assembly 40b and guide means 12, it automatically adjusts the end of the needle 46b to the proper position relative to the end of the stroke of plunger 16. A single gun 10 may, therefore, be used with needle assemblies of any length provided a suitable insert is mounted between the needle assembly and the end of the tubular guide means. The use of these needle assemblies also simplifies manufacturing to precise tolerances because the insert can be carefully matched with the needle length to provide the correct amount of penetration of the plunger through the needle. These inserts may even be permanently coupled to the needle assemblies to insure that they do not become mismatched with the needles. However, the type of construction described herein requires the use of only special needles and inserts with a magazine member 50 that can be used universally.

In Fig. 5 is shown a modified needle assembly 40c which includes a slotted guide 70c for receiving the flanged end 72c of a magazine 74c including a row or charge of pellets 76c. These pellets feed successively one by one into the cavity 78c in front of plunger 16 to be driven through needle 46c into the animal.

In Fig. 7 is shown another modified needle assembly 40d in which the needle assembly hub 79d includes a funneling member 80d for guiding successive round pellets 82d from a cylindrical container 84d mounted with a recess 86d within funneling member 80d. These round pellets are implanted by a stroke of plunger 16 as previously described.

In Fig. 8 is shown a modification 100 of the gun 10 shown in Figs. 1 and 2. Gun 100 includes a similar gear drive arrangement as shown in Figs. 1 and 2, but plunger 116 is flexible to permit its path to be entirely contained within guide 112 and pistol grip member 114. The guide passageway 118, therefore, includes a curved section 220 which diverts plunger 116 down within the pistol grip member.

Flexible plunger member 116 is made, for example, of a strip of spring steel or Phosphor bronze, and it includes a helical ridge 222 running completely about its length. This helical ridge 222 is formed, for example, by machining away the intervening flat portion 223 or by machining a groove and affixing a helical wire therein. However, any convenient method of roughening the surfaces of the plunger 116 can be utilized. As shown in Fig. 10, the interior surface of the plunger driving disc 126 is serrated or grooved as shown at 224 to mate with ridge 222. However, any method of providing a positive resistance or a grip between driving discs 126 and plunger 116 may be utilized.

*Operation*

When an implanting gun such as gun 10 is to be used with larger animals, a relatively longer needle assembly 40a is mounted directly on the end of the actuating member; and the full implanting stroke is employed within the needle 46a. However, when a smaller animal such as a chicken is to be implanted, a shorter needle assembly of type 40b is utilized including a shorter needle 46b and an insert 62b whose length is adjusted to accommodate enough of the working stroke of the plunger 16 to bring plunger 16 just up to the end of needle 46b at the end of its stroke. Insert 62b may either be detachably coupled to the needle assembly 40b or it may be permanently coupled to the needle assembly 40b. In the form of the invention shown herein, the inserts and needle are, for example, detachably coupled to a magazine receiving member 50 in order to permit the same magazine member to be used with different sizes of needles and inserts.

In the modified form of the invention shown in Figs. 8 through 10, the plunger is made of flexible material to permit its rearward motion to be accommodated within pistol grip member 114 which provides a more compact arrangement.

What is claimed is:

1. A device for implanting pellets to various predetermined depths comprising a plunger; said plunger being mounted upon a portable actuating means for reciprocating said plunger through a working stroke of predetermined length; a needle combination of a predetermined length incorporating a needle and an insert; said needle and said insert having their combined length substantially equal to said predetermined length; coupling means attached to said needle combination and to said portable actuating means for removably connecting said needle combination to said actuating means with said insert being interposed between said needle and said actuating means; and said predetermined length of said needle combination and said working stroke of said plunger being arranged to permit said plunger to move to a predetermined depth of penetration through said needle regardless of the length of said needle.

2. A device as set forth in claim 1 wherein said needle combination incorporates an assembly including a pellet magazine feed means disposed adjacent said coupling means to permit said plunger to pick up a pellet therefrom immediately before it begins its working stroke through said needle.

3. A device as set forth in claim 2 wherein said feed means includes a magazine receiving element, and said magazine receiving element and said needle combination are joined by detachable connecting means to permit said magazine receiving elements to be utilized with needles and inserts of varying length.

4. A device as set forth in claim 1 wherein said actuating means includes a hollow guide means, said hollow guide means being mounted upon a pistol grip member, a compound train of spur gears being mounted within said pistol grip member, a trigger means, said gear train operatively connecting said trigger means to said plunger in a speed increasing manner with said trigger to permit a short stroke of said trigger to cause said plunger to move a relatively longer distance at a relatively higher speed.

5. A device as set forth in claim 4 wherein said plunger and said trigger include a rack of gear teeth which engage said gear train.

6. An implanting gun comprising a device as set forth in claim 1 wherein said portable actuating means includes a pistol grip member and a hollow rod mounted thereon, said hollow rod and pistol grip member being recessed to provide a passageway for guiding said plunger, said passageway curving from said hollow rod into said grip member, said plunger being made of a flexible material to permit it to move through said curved passageway, and said portable actuating means being engaged with said plunger.

7. An implanting gun as set forth in claim 6 wherein the surface of said plunger is roughened to facilitate its engagement by said portable actuating means.

8. An implanting gun as set forth in claim 7 wherein said surface of said plunger is roughened by means of a helical ridge formed upon it.

9. A device as set forth in claim 1 wherein said actuating means includes a hollow rod mounted upon a pistol grip member; and insert is comprised of a relatively short hollow element; and said coupling means is comprised of cooperatively shaped projections and recesses disposed upon said needle combination and the end of said hollow rod.

10. A device for implanting pellets to various predetermined depths comprising a plunger; said plunger being mounted upon a portable actuating means for reciprocating said plunger through a working stroke of predetermined length; a needle assembly; an insert; coupling means attached to said needle assembly, both ends of said insert, and to said portable actuating means for removably connecting said needle assembly and said insert to said actuating means with said insert being interposed between said needle assembly and said actuating means; the length of said needle assembly, said insert and said predetermined working stroke of said plunger being arranged to permit said plunger to move to a predetermined depth of penetration through said needle assembly; and said coupling means upon said actuating means and upon said needle assembly being constructed and arranged to permit a needle assembly to be attached directly to said actuating means.

References Cited in the file of this patent

UNITED STATES PATENTS

| | | |
|---|---|---|
| 1,347,622 | Deininger | July 27, 1920 |
| 2,659,369 | Lipman | Nov. 17, 1953 |